(12) United States Patent
Wang et al.

(10) Patent No.: US 9,918,231 B2
(45) Date of Patent: Mar. 13, 2018

(54) METHOD AND SYSTEM FOR DYNAMIC ON-DEMAND CROSS-CHANNEL BANDWIDTH PROVISIONING

(71) Applicant: Aviacomm Inc., Sunnyvale, CA (US)

(72) Inventors: Hans Wang, Mountain View, CA (US); Tao Li, Campbell, CA (US); Binglei Zhang, San Jose, CA (US); Shih Hsiung Mo, San Jose, CA (US)

(73) Assignee: AVIACOMM INC., Sunnyvale, CA (US)

( * ) Notice: Subject to any disclaimer, the term of this patent is extended or adjusted under 35 U.S.C. 154(b) by 0 days.

(21) Appl. No.: 14/791,377

(22) Filed: Jul. 3, 2015

(65) Prior Publication Data
US 2016/0066193 A1    Mar. 3, 2016

Related U.S. Application Data

(60) Provisional application No. 62/042,707, filed on Aug. 27, 2014.

(51) Int. Cl.
| | |
|---|---|
| *H04W 72/00* | (2009.01) |
| *H04W 16/14* | (2009.01) |
| *H04W 72/04* | (2009.01) |
| *H04L 5/00* | (2006.01) |

(52) U.S. Cl.
CPC ............. *H04W 16/14* (2013.01); *H04L 5/001* (2013.01); *H04L 5/0041* (2013.01); *H04L 5/0064* (2013.01); *H04L 5/0087* (2013.01); *H04W 72/0453* (2013.01)

(58) Field of Classification Search
CPC ............................ H04W 16/14; H04W 72/082
USPC ...................... 455/454, 450, 452.1
See application file for complete search history.

(56) References Cited

U.S. PATENT DOCUMENTS

| | | | |
|---|---|---|---|
| 2011/0170495 A1* | 7/2011 | Earnshaw | H04W 72/02 370/329 |
| 2016/0044701 A1* | 2/2016 | Zhang | H04W 28/0278 370/329 |

* cited by examiner

*Primary Examiner* — Chuck Huynh
(74) *Attorney, Agent, or Firm* — Shun Yao; Park, Vaughan, Fleming & Dowler LLP

(57) ABSTRACT

One embodiment of the present invention provides a system for dynamic, on-demand, cross-channel bandwidth provisioning in a wireless communication system. During operation, the system determines, by a scheduler, bandwidth resources that are available in the wireless communication system. The available bandwidth resources comprise a plurality of scattered spectrum pieces. The system defines one or more logical channels that encompass the scattered spectrum pieces, aggregates multiple logical channels in response to determining that spectrum pieces encompassed by a single logical channel do not meet traffic need, and provisions a user or a service using spectrum pieces located within the aggregated multiple logical channels, thereby facilitating on-demand, cross-channel bandwidth provisioning.

21 Claims, 8 Drawing Sheets

METHOD AND SYSTEM FOR DYNAMIC ON-DEMAND CROSS-CHANNEL BANDWIDTH PROVISIONING

RELATED APPLICATION

This application claims the benefit of U.S. Provisional Application No. 62/042,707, entitled "Bandwidth Provisioning Cross Multiple LTE Logical Channels," by inventors Hans Wang, Tao Li, Binglei Zhang, and Shih Hsiung Mo, filed 27 Aug. 2014.

BACKGROUND

Field

The present disclosure relates generally to bandwidth provisioning in a wireless communication system. More specifically, the present disclosure relates to dynamic bandwidth provisioning across multiple Long-Term Evolution (LTE) channels.

Related Art

In the past decade, LTE (also known as 4G LTE) has been replacing the third generation (3G) technology as the current mobile telecommunications technology. It is developed from the GSM (Global System for Mobile Communications)/UMTS (Universal Mobile Telecommunications System) technology. By using new DSP (digital signal processing) techniques and modulations, LTE can increase the capacity and speed of wireless data networks.

According to 3GPP (3rd Generation Partnership Project), the group that develops the LTE standard, the motivations for LTE include the user demand for higher data rates and quality of service, the continued demand for cost reduction (in both capital expenditures and operational expenditures), and the need to avoid unnecessary fragmentation of technologies for paired and unpaired band operation.

The main requirements of the LTE networks are high spectral efficiency, high peak data rates, and short round trip time, as well as flexibility in frequency and bandwidth. More specifically, to achieve high radio spectral efficiency as well as to enable efficient scheduling in both the time and frequency domains, LTE uses a multicarrier approach for multiple access, such as Orthogonal Frequency Division Multiple Access (OFDMA). OFDMA is a multicarrier technology subdividing the available bandwidth into a multitude of mutual orthogonal narrowband subcarriers, which can be shared among multiple users. In LTE, both the downlink and the uplink can dynamically assign radio resources to meet different users' traffic requirements. The minimum radio resource described in the LTE standard is called a resource block (RB), which consists of 12 consecutive subcarriers, or 180 kHz, for the duration of one slot (7 symbols or 0.5 ms).

To enable possible deployment around the world, supporting as many regulatory requirements as possible, LTE is developed for a number of frequency bands, ranging from 700 MHz up to 2.7 GHz. The available bandwidths are also flexible, including 1.4 MHz, 3 MHz, 5 MHz, 10 MHz, 15 MHz, and 20 MHz. In LTE, in order to increase the bandwidth, hence the bitrate, allocated to a user, multiple (up to five) channels can be aggregated, known as carrier aggregation. When carrier aggregation is used, a user can be allocated resources on any one of the aggregated channels.

Although able to increase available bandwidth provisioned to a user, LTE carrier aggregation does not work for systems where available resources are scattered among different logical channels and when user needs may change dynamically.

SUMMARY

One embodiment of the present invention provides a system for dynamic, on-demand, cross-channel bandwidth provisioning in a wireless communication system. During operation, the system determines, by a scheduler, bandwidth resources that are available in the wireless communication system. The available bandwidth resources comprise a plurality of scattered spectrum pieces. The system defines one or more logical channels that encompass the scattered spectrum pieces, aggregates multiple logical channels in response to determining that spectrum pieces encompassed by a single logical channel do not meet traffic need, and provisions a user or a service using spectrum pieces located within the aggregated multiple logical channels, thereby facilitating on-demand, cross-channel bandwidth provisioning.

In a variation on this embodiment, the system obtains an update to the available bandwidth resources, and redefines one or more logical channels based on the update to the available bandwidth resources.

In a variation on this embodiment, at least one scattered spectrum piece has a bandwidth that is smaller than 1.4 MHz.

In a variation on this embodiment, a bandwidth of the logical channels is in compliance with a Long-Term Evolution (LTE) standard.

In a further variation, aggregating the multiple logical channels involves performing LTE carrier aggregation.

In a variation on this embodiment, defining the one or more logical channels involves identifying a scattered spectrum piece whose bandwidth is greater than a predetermined value, and defining a logical channel that is centered at the identified scattered spectrum piece.

In a variation on this embodiment, the system disaggregates previously aggregated multiple logical channels in response to determining that spectrum pieces encompassed by a single logical channel meet traffic need.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a method and a system for dynamically allocating resources. During operation, the system defines logical channels based on scattered spectrum pieces that are available for provisioning. The system monitors traffic need. When bandwidth required by a user or service exceeds the bandwidth that is available in a single logical channel, the system dynamically aggregates multiple logical channels to enable on-demand, cross-channel bandwidth provisioning.

Dynamic, On-Demand, Cross-Channel Bandwidth Provisioning

In modern radio communication systems, user demand of data rate is ever increasing. For example, LTE Advanced promised up to 1 Gbps downlink speed. Such a high data rate makes it necessary to increase the transmission bandwidths over those that can be supported by a single carrier or channel. To solve carrier aggregation (also known as channel aggregation) has been used in Advanced LTE systems to increase the overall transmission bandwidth. More particularly, carrier aggregation allows multiple channels to be aggregated into a single large channel, and a user can be allocated resources on any one of the carriers.

Figure 1:
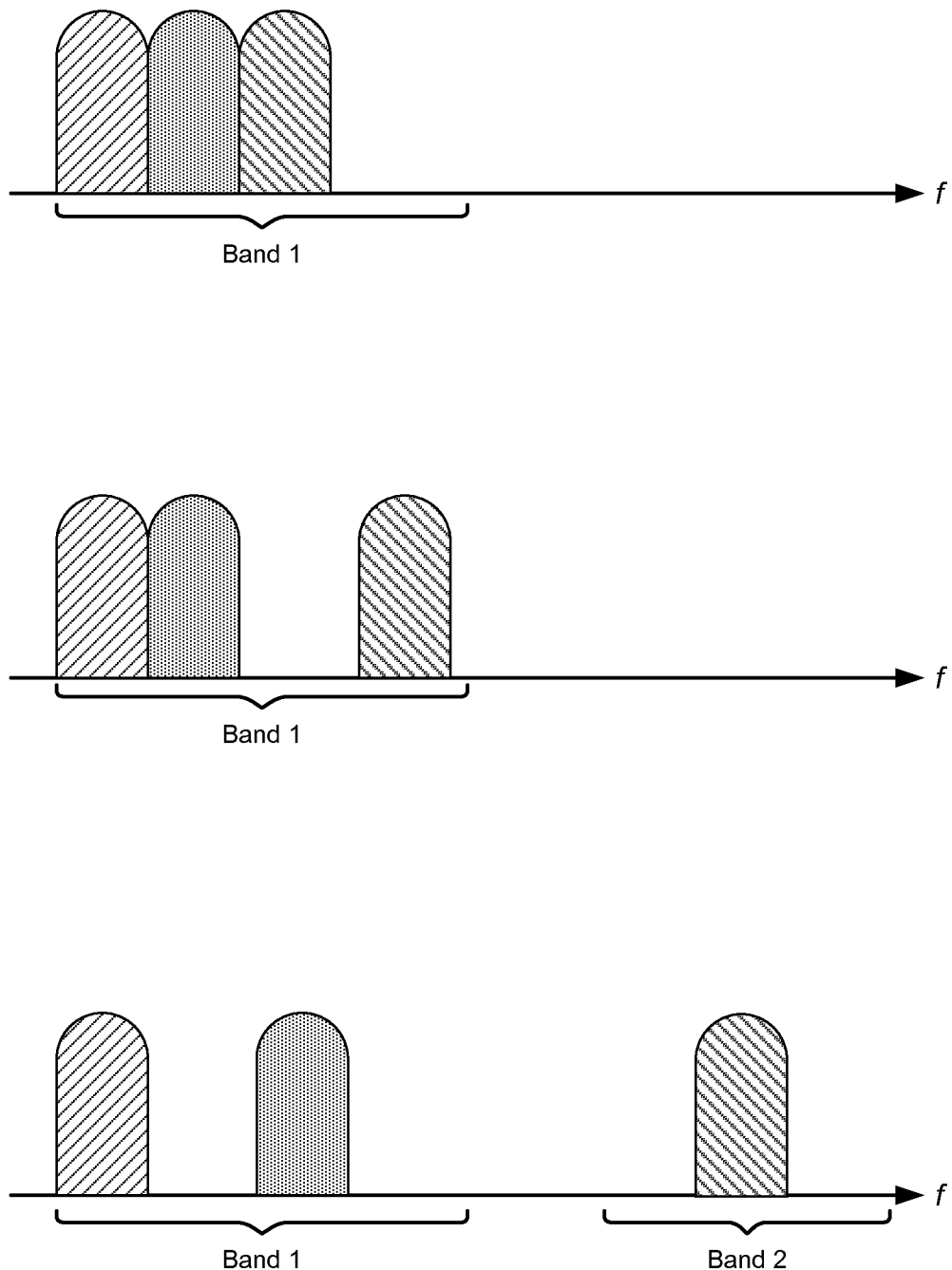
FIG. 1 presents a diagram illustrating different LTE channel aggregation scenarios.

FIG. 1 presents a diagram illustrating different LTE channel aggregation scenarios. Each aggregated carrier is referred to a component carrier. In LTE, the component carrier can have a bandwidth of 1.4, 3, 5, 10, 15, or 20 MHz, and a maximum of five component carriers can be aggregated. The top portion of FIG. 1 illustrates a carrier-aggregation scenario where the aggregated carriers are continuous component carriers within the same operating frequency band (as defined for LTE). This carrier-aggregation scheme is called intraband contiguous carrier aggregation. The spacing between the center frequencies of two continuous component carriers is N×300 kHz, with N being an integer. Note that, although the intraband contiguous scheme is the easiest way to arrange aggregation, it might not always be possible, due to operator frequency allocation scenarios.

The middle portion of FIG. 1 illustrates a carrier-aggregation scenario where the aggregated carriers are within the same operating frequency band, but are not adjacent to each other. This carrier-aggregation scheme is called intraband non-contiguous carrier aggregation. The bottom portion of FIG. 1 illustrates a carrier-aggregation scenario where the aggregated carriers are located within different operating frequency bands. This carrier-aggregation scheme is called interband non-contiguous carrier aggregation. Interband non-contiguous carrier aggregation is of particular use due to the fragmentation of bands. Note that some bands may be only 10 MHz wide.

From FIG. 1, one can see that LTE carrier aggregation operates by aggregating more than one LTE channel, which can be located in the same band or different frequency bands. It is assumed that, if one LTE channel is available for resource allocation, then the entire spectrum within the LTE channel is available for allocation. LTE channel allocation is not suitable for situations where available spectra are only a fraction of an LTE channel. For example, certain communication systems may only support scattered, non-continuous narrower channels, such as channels having a bandwidth as small as 500 kHz. Efficient utilization of these smaller, scattered pieces of spectrum is important.

Moreover, LTE carrier aggregation is a static solution where the spectrum locations of the various channels are predetermined and the channels have been aggregated into a single resource pool beforehand, regardless of actual need. On the other hand, the available spectrum, hence the locations of the channels, in certain communication systems may change over time. In addition, demands for resources may also be time varying. When the user demand for spectrum is low, there is no need to aggregate resources because a single piece of continuous spectrum can satisfy user need. Note that, although aggregation of spectrum resources can increase data rate, it also adds system complexity. Hence, it is desirable to invoke resource aggregation only when needed.

Figure 2:
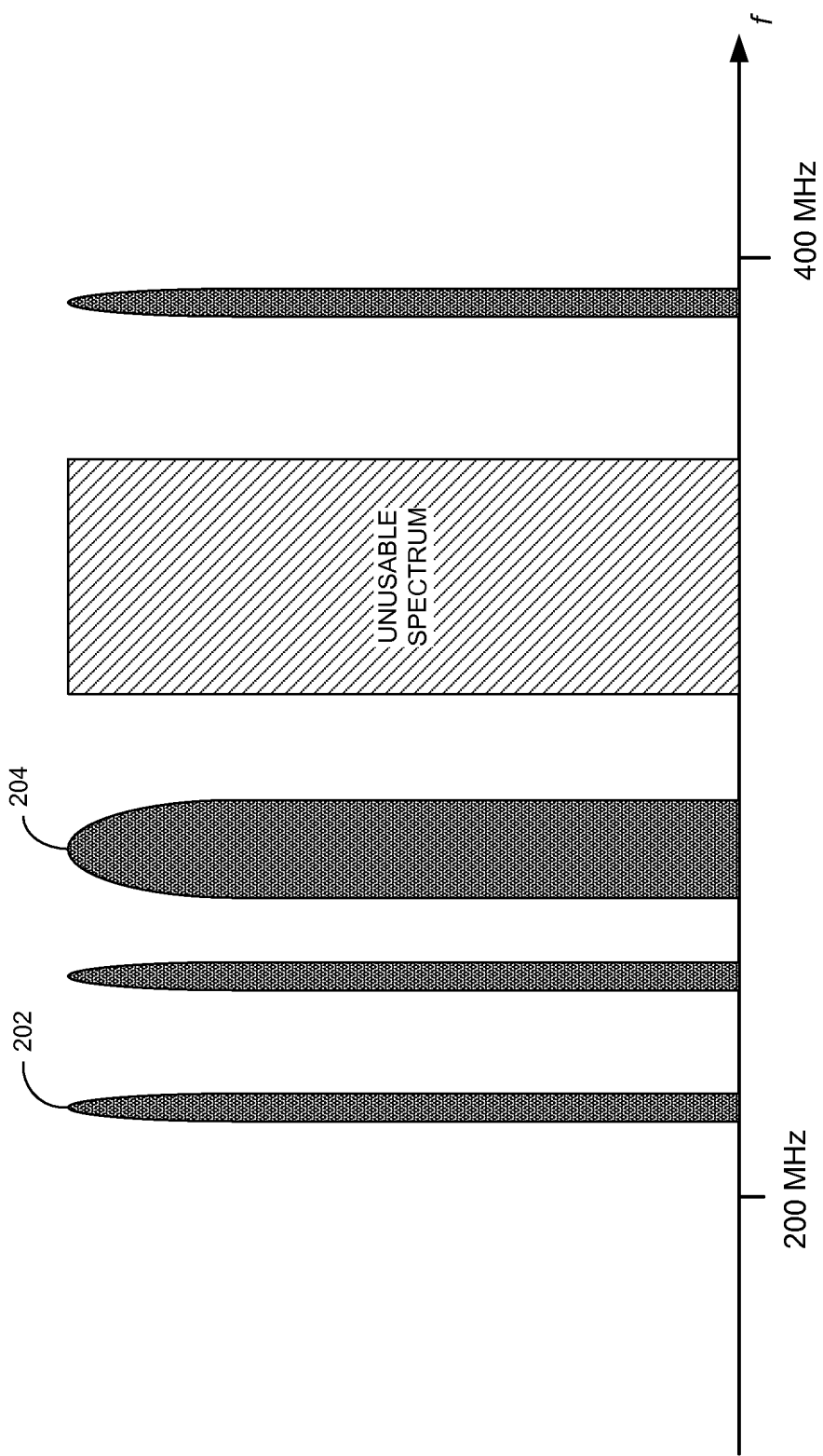
FIG. 2 presents a diagram illustrating available spectrum in an exemplary radio communication system.

FIG. 2 presents a diagram illustrating available spectrum in an exemplary radio communication system. In FIG. 2, a communication system operates over a frequency band that ranges from 200 MHz to 400 MHz. Within such a frequency range, there are scattered pieces of spectrum, such as spectrum pieces 202 and 204, which are available for provisioning to users or services. In addition, there may be a region of unusable spectrum within the frequency band. The spectrum pieces available for resource provisioning can be quite narrow. For example, spectrum piece 202 has a bandwidth of merely 500 kHz, and spectrum piece 204 has a bandwidth of around 1.2 MHz. Therefore, the user data rate is limited if only an individual spectrum piece is assigned to the user. To increase the data rate, it is desirable to aggregate multiple spectrum pieces into a single resource. One may want to implement existing technologies, such as LTE carrier aggregation, to accomplish this task. However, because the sizes of the scattered spectrum pieces are very different from the LTE channel bandwidth (the narrowest channel defined by current LTE standards has a bandwidth of 1.4 MHz), one cannot directly implement LTE carrier aggregation in such a communication system. Moreover, in certain communication systems, spectrum pieces that are available for resource provisioning may change dynamically. For example, as time changes, spectrum piece 202 may no longer be available, and a different spectrum piece with a different bandwidth at a different frequency may emerge as newly available. The static solution provided by LTE carrier aggregation in general does not work when available carriers change dynamically.

To solve such a problem, embodiments of the present invention dynamically define one or more logical channels that encompass the scattered available spectrum pieces. Note that here the term "logical channel" is used to refer to a logically defined frequency channel that can include multiple separated usable spectrum pieces, and is different from the LTE logical channels that provide services for the MAC layer within the LTE protocol structure. Sometimes the logically defined channel can also be called a "super channel" that includes multiple sub-channels (or spectrum pieces). These logically defined channels or super channels comply with the LTE standard, making it possible to apply LTE carrier aggregation. Information of the logical channels and available spectrum pieces within each individual logical channel is sent to the scheduler to enable the scheduler to schedule data on subcarriers within the available spectrum pieces.

Figure 3:
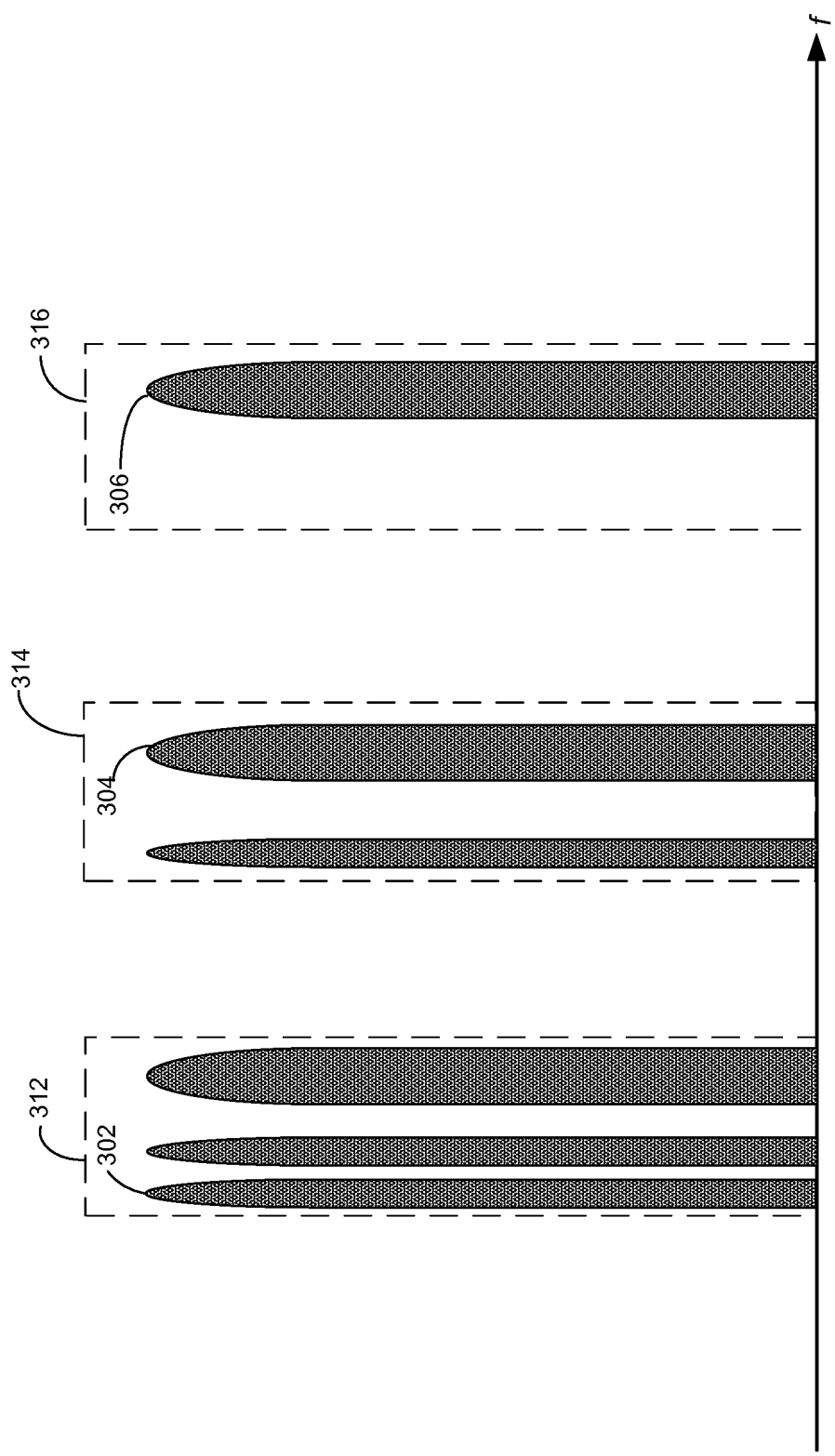
FIG. 3 presents a diagram illustrating an exemplary scenario where logical channels are defined, in accordance with an embodiment of the present invention.

FIG. 3 presents a diagram illustrating an exemplary scenario where logical channels are defined, in accordance with an embodiment of the present invention. FIG. 3 illustrates a number of available spectrum pieces, such as spectrum pieces 302, 304, and 306. Depending on the actual system, the bandwidths of the spectrum pieces may be of certain fixed values or arbitrary values. In some embodiments, the bandwidths of the spectrum pieces can be 500 kHz, 1.2 MHz, or any other arbitrary value. For example, spectrum piece 302 has a bandwidth of 500 kHz, and the bandwidth of spectrum pieces 304 and 306 is about 1.2 MHz.

FIG. 3 also illustrates a number of logical channels that are defined to encompass the spectrum pieces. More specifically, a logical channel 312 is defined to encompass spectrum piece 302 and two other adjacent spectrum pieces; logical channel 314 encompasses spectrum piece 304 and an adjacent spectrum piece; and logical channel 316 encompasses a single spectrum piece 306. In some embodiments, the logical channels are defined to be in compliance with current LTE standards. For example, the bandwidths of the defined logical channels can be 1.4 MHz, 3 MHz, 5 MHz, 10 MHz, or 20 MHz.

In further embodiments, the logical channels are defined in such a way that a single logical channel can encompass as many available spectrum pieces as possible. For example, in FIG. 3, the system defines a logical channel 312 in order to encompass spectrum piece 302 and two other adjacent spectrum pieces. Similarly, logical channel 314 is defined at a spectrum location to encompass spectrum piece 304 and an adjacent spectrum piece; and logical channel 316 is defined to encompass spectrum piece 306. Note that the system may run an optimization algorithm to determine the best strategy to define the logical channels. In one embodiment, the optimization goal can be to ensure that the ratio between the available spectrum in the defined channels and the unavailable spectrum in the defined channels is maximized.

Figure 4:
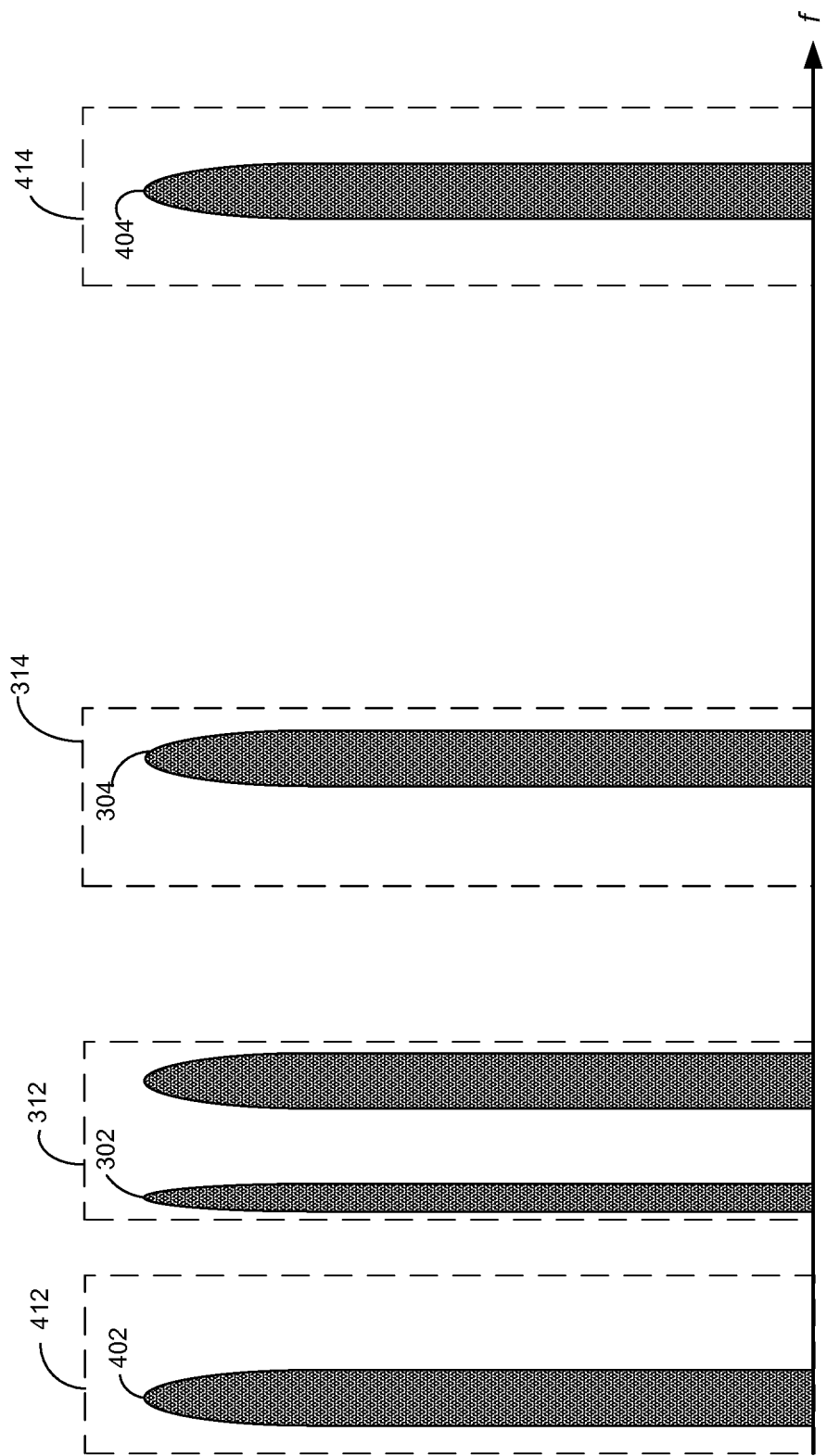
FIG. 4 presents a diagram illustrating an update to the logical channels in response to an update to the available spectrum, in accordance with an embodiment of the present invention.

In certain communication systems the number and location of the available spectrum pieces can change periodically. Accordingly, the system redefines a number of logical channels to encompass current available spectrum pieces. FIG. 4 presents a diagram illustrating an update to the logical channels in response to an update to the available spectrum, in accordance with an embodiment of the present invention. Compared with FIG. 3, one can see that in FIG. 4, one of the spectrum pieces adjacent to spectrum piece 302, the one adjacent to spectrum piece 304, and spectrum piece 306 are no longer available. On the other hand, two new spectrum pieces, spectrum pieces 402 and 404, become available for provisioning. In response to this spectrum change, the system updates its assignment of logical channels. In FIG. 4, logical channels 312 and 314 remain unchanged, even though the spectrum pieces within these two logical channels have been updated. Logical channel 316 from FIG. 3 no longer exists because there is no available spectrum at the corresponding spectrum location. In addition, the system defines two new logical channels, channels 412 and 414, to encompass the newly available spectrum pieces 402 and 404, respectively.

Once the logical channels are defined, because they are in compliance with the LTE standard, the system can apply the LTE channel aggregation to aggregate multiple such logical channels into a large aggregated channel, thus making it possible to increase the user data rate. In some embodiments, the aggregation of the logical channels may happen on demand. In other words, the system may determine, based on user need, whether to aggregate multiple channels. For example, when the number of active users is low, the system may determine that a single logical channel that includes sufficient spectrum pieces can provide enough resource blocks (RBs) to meet all user need. On the other hand, when the number of active users increases, the system may determine that the single logical channel cannot provide enough RBs to meet all user need, and that two logical channels are needed. Consequently, the system can aggregate two logical channels. If the number of users continues to increase, the system may need to aggregate more logical channels in order to provide enough RBs to meet the need of all users. In other words, embodiments of the present invention provide a dynamic resource-provisioning scheme that performs on-demand channel aggregation.

In the examples shown in FIGS. 3 and 4, when defining the logical channels, the system did not consider the synchronization requirement. In practice, a user equipment (UE) wishing to access the LTE system follows a cell search procedure which includes a series of synchronization stages by which the UE determines time and frequency parameters that are necessary to demodulate downlink signals, to transmit with correct timing and to acquire some critical system parameters. During synchronization stages, the UE uses two special signals broadcast on each cell: Primary Synchronization Sequence (PSS) and Secondary Synchronization Sequence (SSS), which occupy the central 6 RBs, irrespective of the system channel bandwidth, which allows the UE to synchronize to the network without a priori knowledge of the allocated bandwidth. Note that 6 RBs requires a minimum bandwidth of 6×180 kHz=1.08 MHz. Therefore, to implement LTE in a system of scattered spectrum pieces by defining logical channels, one needs to ensure that there are at least 6 RBs available at the center of each logical channel. In some embodiments, when defining logical channels, the system locates a spectrum piece that is at least 1.08 MHz (6 RBs) wide, uses the location of this spectrum piece as an anchor point, and defines a logical channel that centers at the anchor point. On the other hand, the system may also run other types (non-LTE) of synchronization schemes. In such cases, there may not be a need to define an anchor point prior to defining a logical channel.

Figure 5:
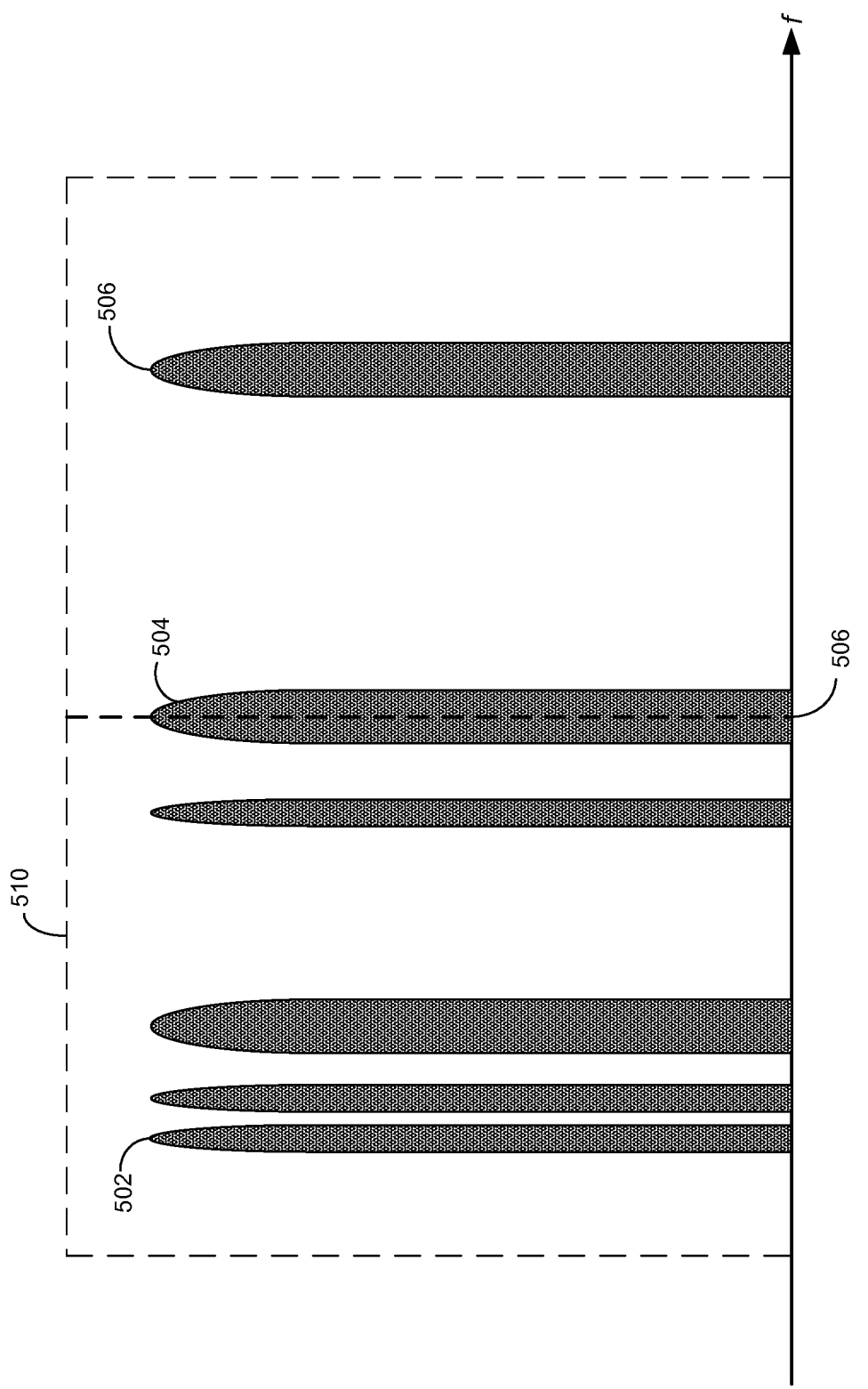
FIG. 5 presents a diagram illustrating defining logical channels around an anchor point, in accordance with an embodiment of the present invention.

FIG. 5 presents a diagram illustrating defining logical channels around an anchor point, in accordance with an embodiment of the present invention. In FIG. 5, the spectral profile is similar to the one shown in FIG. 3, which includes a number of scattered spectrum pieces, some of which are narrower and some of which are wider. For example, spectrum piece 502 has a bandwidth of 500 kHz, and spectrum pieces 504 and 506 have a bandwidth of 1.2 MHz. The 500 kHz spectrum piece only contains 2 RBs, and hence is not sufficient for synchronization. On the other hand, the 1.2 MHz spectrum pieces include 6 RBs, and can be used for LTE synchronization. In some embodiments, the system identifies a sufficiently wide spectrum piece, such as spectrum piece 504, and marks the center location of that spectrum piece as an anchor point, such as anchor point 506. The system then defines a logical channel with the center of the logical channel at the anchor point. In the example shown in FIG. 5, a logical channel 510 with a bandwidth of 20 MHz is defined to encompass the spectrum pieces, and the center of logical channel 510 is anchor point 506. Consequently, the central 6 RBs of logical channel 510 will be within spectrum piece 504, and synchronization signals (including both PSS and SSS) will be broadcast over these 6 RBs. In other words, spectrum piece 504 is mostly used for synchronization. Other spectrum pieces, such as spectrum pieces 502 and 506, provide RBs that can be dynamically assigned to UEs. Note that each 500 kHz spectrum piece provides 2 RBs, and each 1.2 MHz spectrum piece provides 6 RBs. In the example shown in FIG. 5, it also possible to choose other spectrum pieces, such as spectrum piece 506, as an anchor point when defining logical channels, as long as the chosen spectrum piece is at least 1.08 MHz wide. Compared with a conventional 20 MHz channel in LTE, which can provide 100 continuous RBs, the logical channels defined for the system with scattered spectrum pieces often provides fewer RBs. More specifically, different logical channels may encompass spectrum pieces of different numbers and sizes. Note that if all spectrum pieces available in the system are at least 1.08 MHz wide, the system can select any spectrum piece as an anchor to define a logical channel. In this case, the logical channels can be defined to optimize the ratio of the usable spectrum among all channels.

Figure 6:
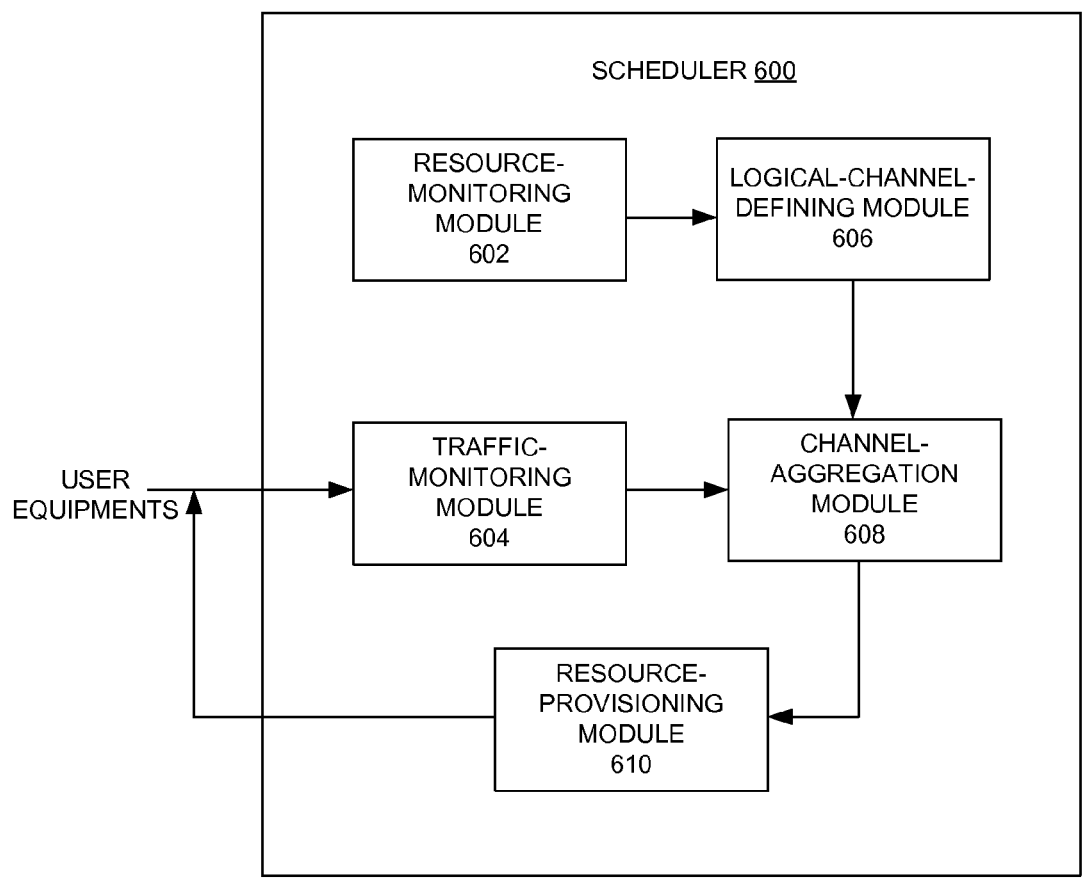
FIG. 6 presents a diagram illustrating the exemplary architecture of a scheduler, in accordance with an embodiment of the present invention.

FIG. 6 presents a diagram illustrating the exemplary architecture of a scheduler, in accordance with an embodiment of the present invention. In FIG. 6, a scheduler 600 includes a resource-monitoring module 602, a traffic-monitoring module 604, a logical-channel-defining module 606, a channel-aggregation module 608, and a resource-provisioning module 610.

Resource-monitoring module 602 is responsible for monitoring the status of available resources. In a communication system whose usable spectrum includes periodically updated and scattered small spectrum pieces, resource-monitoring module 602 identifies currently available spectrum pieces and determines their bandwidths and spectrum locations.

Logical-channel-defining module 606 is responsible for defining logical channels. More specifically, logical-channel-defining module 606 receives input from resource-monitoring module 602, which indicates the bandwidths and spectrum locations of all currently available spectrum pieces, and defines a number of logical channels that collectively encompass all the currently available spectrum pieces. In some embodiments, logical-channel-defining module 606 defines logical channels that meet the channel bandwidth requirement of the LTE standard. In other words, the defined logical channels may have a bandwidth of 1.4 MHz, 3 MHz, 5 MHz, 10 MHz, or 20 MHz. Moreover, to ensure proper LTE synchronization, logical-channel-defining module 606 first identifies a spectrum piece that is at least as wide as 1.08 MHz, and uses the identified spectrum piece as an anchor point to define logical channels in such a way that the center of the logical channel is the center of the identified spectrum piece.

In some embodiments, logical-channel-defining module 606 may define logical channels in such a way that all spectrum pieces are encompassed by a minimum number of channels. In other words, the resulting system has a minimum number of channels. In further embodiments, the channel bandwidth may be predetermined or optimized based on the currently available spectrum pieces. In some embodiments, logical-channel-defining module 606 may define logical channels at fixed spectrum locations having a predetermined bandwidth. Note that there is tradeoff between spectral efficiency and computation complexity. Note that, in cases where some scattered spectrum pieces are narrower than 1.08 MHz, to implement LTE, logical-channel-defining module 606 first identifies one or more spectrum pieces that are at least 1.08 MHz, and then uses the identified spectrum pieces as anchor points to define logical channels. Logical-channel-defining module 606 can define logical channels in such a way that the identified spectrum pieces are at the center of the defined logical channels.

Traffic-monitoring module 604 is responsible for monitoring the current traffic need. In some embodiments, traffic-monitoring module 604 may be responsible for receiving requests from users or services for resources (bandwidth). The traffic-monitoring output, which may indicate the number of users requesting bandwidth, is sent to channel-aggregation module 608.

Channel-aggregation module 608 is responsible for aggregating multiple logical channels based on the defined channels and the traffic-monitoring output. In some embodiments, channel-aggregation module 608 may determine, based on the defined logical channels and the traffic monitoring output, whether a single defined channel is sufficient to meet current traffic need. If so, channel-aggregation module 608 may identify that single channel, and instruct resource-provisioning module 610 to allocate available RBs within the identified single channel to users. On the other hand, channel-aggregation module 608 may determine that none of the single channels can by itself meet the current traffic need, and channel aggregation is needed. In this case, channel-aggregation module 608 may identify a number of channels that, when aggregated, can provide sufficient resources to meet the current traffic need.

Note that, compared to a standard LTE system where channels are identical (i.e., they all include continuous frequency resources that extend throughout the entire channel bandwidth), in the current communication system, the dynamically defined logical channels are not identical, as different logical channels may include different available spectrum pieces. For example, in FIG. 3, logical channel 312 has 4×500 kHz=2 MHz usable spectrum, and logical channel 314 has 500 kHz+1.2 MHz=1.25 MHz. In some embodiments, channel-aggregation module 608 computes a channel-aggregation solution that requires the least aggregation efforts. In other words, the optimized solution aggregates as few channels as possible. For example, channel-aggregation module 608 can sort the logical channels based on the available spectrum within each channel, starting with the channel having the largest available spectrum, and adding one channel at a time until the aggregated channel can provide sufficient bandwidth to meet the current traffic need. In the example shown in FIG. 3, logical channels 312 and 314 may be the first to be aggregated. In some embodiments, channel-aggregation module 608 may simply start from the leftmost logical channel (the channel with the lowest carrier frequency) and aggregate sequentially toward the right until the aggregated channel can provide sufficient bandwidth to meet the current traffic need. In FIG. 4, logical channels 412 and 312 may be the first to be aggregated. Similarly, it is also possible to start from the rightmost and move toward the left.

Resource-provisioning module 610 is responsible for allocating resources, such as RBs, to users or services. In some embodiments, resource-provisioning module 610 allocates RBs from an aggregated channel (meaning that they may be located in different logical channels) to a user or service.

Figure 7:
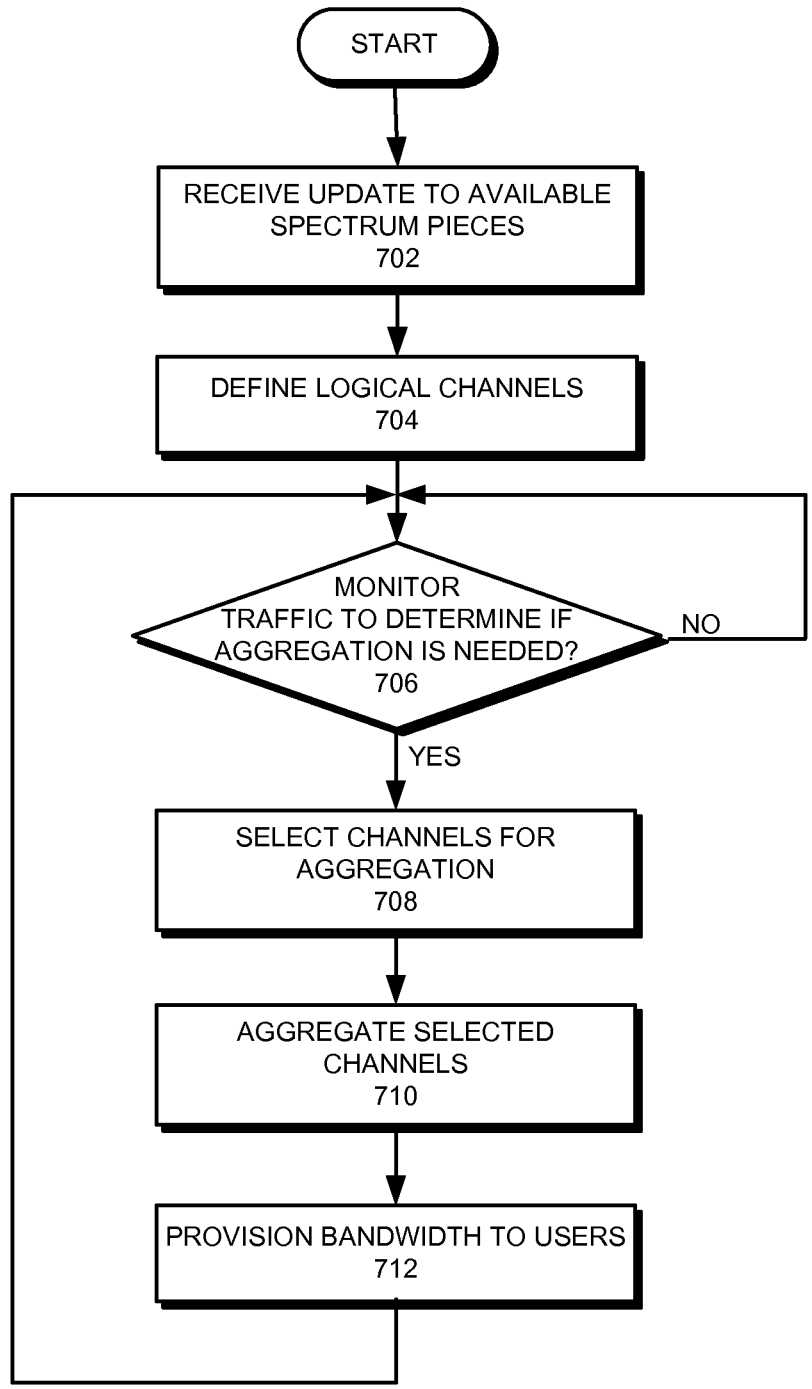
FIG. 7 presents a flowchart illustrating an exemplary bandwidth provisioning process, in accordance with an embodiment of the present invention.

FIG. 7 presents a flowchart illustrating an exemplary bandwidth provisioning process, in accordance with an embodiment of the present invention. During operation, the system receives an update to the available spectrum pieces (operation 702). Note that, in many wireless communication systems, spectrum pieces that are available for provisioning may change periodically. For example, the Federal Communications Commission (FCC) has allocated certain frequency bands for aviation purposes. For example, civil aviation uses a band between 108 and 137 MHz for radio communication, and military aircraft uses a UHF band that is between 225.0 and 399.95 MHz for air-to-air and air-to-ground communication. Within each frequency band, the channels (spectrum pieces) that are available for usage may be updated periodically. For example, the regulatory authorities may re-assign a spectrum, or some spectrum pieces that were previously in use may now be released and become available.

Based on the available spectrum pieces, the system defines one or more logical channels that encompass all of the available spectrum pieces (operation 704). For systems with available resources being updated periodically, the defined logical channels are updated accordingly. In some embodiments, while defining the logical channels, the system identifies anchor points, i.e., spectrum pieces that are at least 1.08 MHz wide. The logical channels are defined in such a way that they are centered at these anchor points. In some embodiments, the logical channels are defined in such a way that the channel bandwidths are in compliance with the LTE standard.

The system then determines, based on current traffic needs, whether channel aggregation is needed (operation 706). In some embodiments, the system may determine whether the total spectrum pieces within any single logical channel can meet the traffic need. If channel aggregation is needed, the system selects multiple channels to be aggregated (operation 708). The system may select aggregated channels based on certain criteria. In some embodiments, the system selects a minimum number of channels that can meet the current traffic needs. In some embodiments, the system may sequentially, following the spectrum order, select channels until the aggregated channel is large enough to meet the traffic need. The system then aggregates the selected channels into an aggregated channel (operation 710). In some embodiments, the system aggregates the channels in a way that is similar to LTE carrier aggregation. Once the aggregated channel is formed dynamically, the system can provision bandwidth to users or services (operation 712). For example, the system may allocate RBs, which are located within different logical channels but are within the aggregated channel, to a user or a service. In some embodiments, the resource-assignment information is sent to UEs via control messages similar to the ones used in LTE. Note that, in LTE carrier aggregation, the component carriers are numbered to allow the scheduling to specify which component carrier a grant relates to. In LTE, the RBs within each channel are continuous subcarriers. On the other hand, in embodiments of the present invention, the bandwidth resources (RBs) in each logical channel are not necessary continuous subcarriers; therefore, an appropriate naming scheme is needed to identify each available RB. In some embodiments, the RBs within each logical channel are numbered in a way that is similar to LTE, except that the available RBs are not numbered continuously. The system continues to monitor the traffic to determine whether the aggregation is still needed by returning to operation 706. In some embodiments, if the system determines that the current traffic need does not require channel aggregation, the system may disaggregate the previously aggregated channels and provision bandwidth to users using resources contained in a single logical channel. Note that the scheduling overhead can be reduced when channel aggregation is not used. Therefore, by aggregating channels on-demand, embodiments of the present invention can reduce the overall scheduling complexity.

Figure 8:
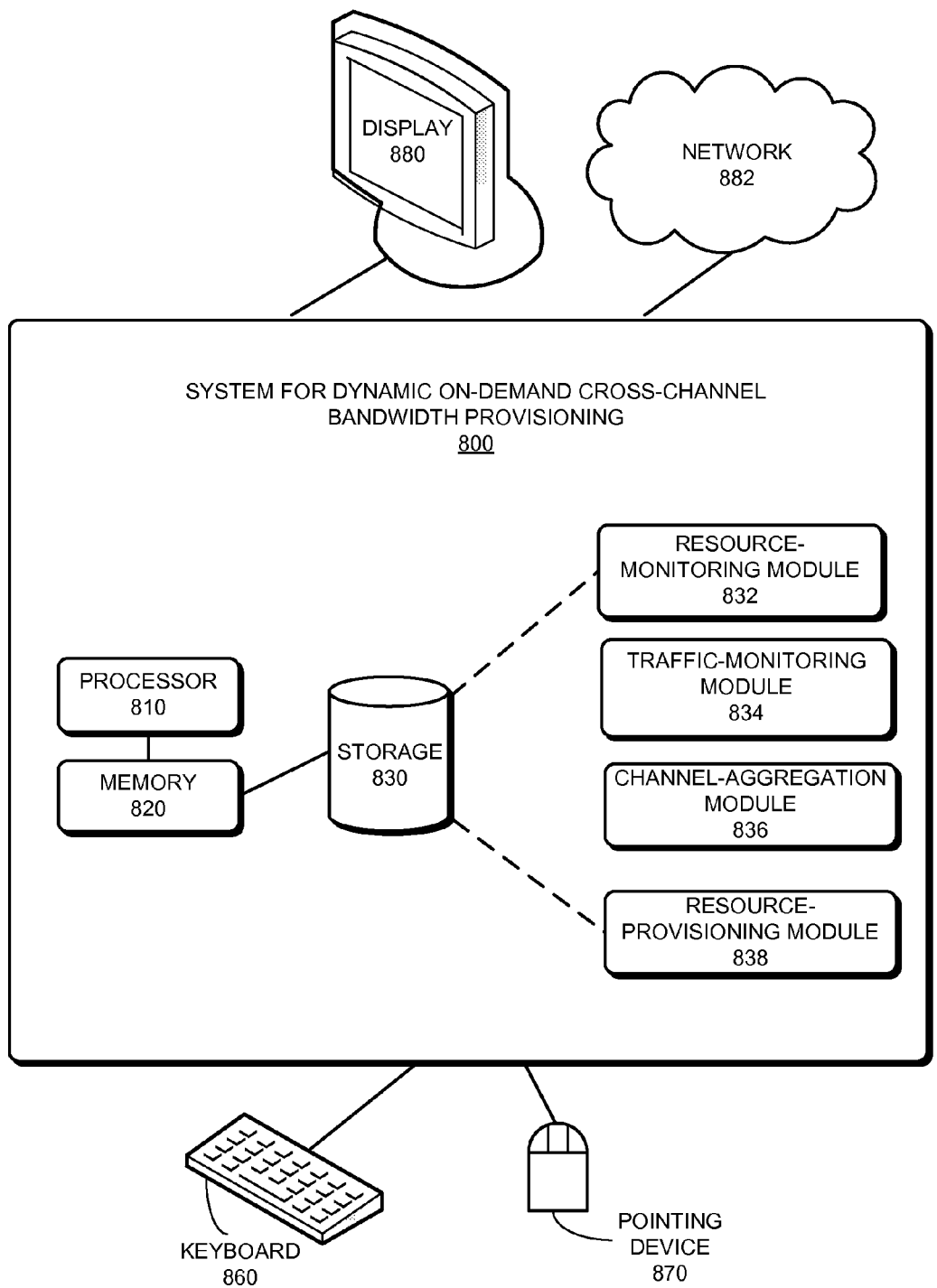
FIG. 8 illustrates an exemplary system for dynamic, on-demand, cross-channel bandwidth provisioning, in accordance with an embodiment of the present invention.

FIG. 8 illustrates an exemplary system for dynamic, on-demand, cross-channel bandwidth provisioning, in accordance with an embodiment of the present invention. A dynamic, on-demand, cross-channel bandwidth provisioning system 800 comprises a processor 810, a memory 820, and a storage 830. Storage 830 typically stores instructions that can be loaded into memory 820 and executed by processor 810 to perform the methods mentioned above. In one embodiment, the instructions in storage 830 can implement a resource-monitoring module 832, a traffic-monitoring module 834, a channel-aggregation module 836, and a resource-provisioning module 838, all of which can be in communication with each other through various means.

In some embodiments, modules 832, 834, 836, and 838 can be partially or entirely implemented in hardware and can be part of processor 810. Further, in some embodiments, the system may not include a separate processor and memory. Instead, in addition to performing their specific tasks, modules 832, 834, 836, and 838, either separately or in concert, may be part of general- or special-purpose computation engines.

Storage 830 stores programs to be executed by processor 810. Specifically, storage 830 stores a program that implements a system (application) for dynamic, on-demand, cross-channel bandwidth provisioning. During operation, the application program can be loaded from storage 830 into memory 820 and executed by processor 810. As a result, dynamic, on-demand, cross-channel bandwidth provisioning system 800 can perform the functions described above. Dynamic, on-demand, cross-channel bandwidth provisioning system 800 can be coupled to an optional display 880 (which can be a touchscreen display), a keyboard 860, and a pointing device 870, and can also be coupled via one or more network interfaces to network 882.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for dynamic, on-demand, cross-channel bandwidth provisioning in a wireless communication system, comprising:
   determining, by a scheduler, bandwidth resources that are available in the wireless communication system, wherein the available bandwidth resources comprise a plurality of scattered spectrum pieces;
   defining one or more logical channels that encompass the scattered spectrum pieces;
   in response to determining that spectrum pieces encompassed by a single logical channel do not meet traffic need, aggregating multiple logical channels; and
   provisioning a user or a service using spectrum pieces located within the aggregated multiple logical channels, thereby facilitating on-demand, cross-channel bandwidth provisioning.

2. The method of claim 1, further comprising:
   obtaining an update to the available bandwidth resources; and
   redefining one or more logical channels based on the update to the available bandwidth resources.

3. The method of claim 1, wherein at least one scattered spectrum piece has a bandwidth that is smaller than 1.4 MHz.

4. The method of claim 1, wherein a bandwidth of the logical channels is in compliance with a Long-Term Evolution (LTE) standard.

5. The method of claim 4, wherein aggregating the multiple logical channels involves performing LTE carrier aggregation.

6. The method of claim 1, wherein defining the one or more logical channels involves:
   identifying a scattered spectrum piece whose bandwidth is greater than a predetermined value; and
   defining a logical channel that is centered at the identified scattered spectrum piece.

7. The method of claim 1, further comprising:
   in response to determining that spectrum pieces encompassed by a single logical channel meet traffic need, disaggregating previously aggregated multiple logical channels.

8. A non-transitory computer-readable storage medium storing instructions that when executed by a computing device cause the computing device to perform a method for dynamic, on-demand, cross-channel bandwidth provisioning in a wireless communication system, the method comprising:
   determining, by a scheduler, bandwidth resources that are available in the wireless communication system, wherein the available bandwidth resources comprise a plurality of scattered spectrum pieces;
   defining one or more logical channels that encompass the scattered spectrum pieces;
   in response to determining that spectrum pieces encompassed by a single logical channel do not meet traffic need, aggregating multiple logical channels; and
   provisioning a user or a service using spectrum pieces located within the aggregated multiple logical channels, thereby facilitating on-demand, cross-channel bandwidth provisioning.

9. The computer-readable storage medium of claim 8, wherein the method further comprises:
   obtaining an update to the available bandwidth resources; and
   redefining one or more logical channels based on the update to the available bandwidth resources.

10. The computer-readable storage medium of claim 8, wherein at least one scattered spectrum piece has a bandwidth that is smaller than 1.4 MHz.

11. The computer-readable storage medium of claim 8, wherein a bandwidth of the logical channels is in compliance with a Long-Term Evolution (LTE) standard.

12. The computer-readable storage medium of claim 11, wherein aggregating the multiple logical channels involves performing LTE carrier aggregation.

13. The computer-readable storage medium of claim 8, wherein defining the one or more logical channels involves:
   identifying a scattered spectrum piece whose bandwidth is greater than a predetermined value; and
   defining a logical channel that is centered at the identified scattered spectrum piece.

14. The computer-readable storage medium of claim 8, wherein the method further comprises:
   in response to determining that spectrum pieces encompassed by a single logical channel meet traffic need, disaggregating previously aggregated multiple logical channels.

15. A scheduler for dynamic, on-demand, cross-channel bandwidth provisioning in a wireless communication system, the scheduler comprising:
   a processor;
   a memory storing instructions that when executed by the processor cause the processor to perform a method, the method comprising:
      determining bandwidth resources that are available in the wireless communication system, wherein the available bandwidth resources comprise a plurality of scattered spectrum pieces;
      defining one or more logical channels that encompass the scattered spectrum pieces;
      aggregating multiple logical channels in response to determining that spectrum pieces encompassed by a single logical channel do not meet traffic need; and
      provisioning a user or a service using spectrum pieces located within the aggregated multiple logical channels, thereby facilitating on-demand, cross-channel bandwidth provisioning.

16. The scheduler of claim 15, wherein the method further comprises:
   obtaining an update to the available bandwidth resources; and
   redefining one or more logical channels based on the update to the available bandwidth resources.

17. The scheduler of claim 15, wherein at least one scattered spectrum piece has a bandwidth that is smaller than 1.4 MHz.

18. The scheduler of claim 15, wherein a bandwidth of the logical channels is in compliance with a Long-Term Evolution (LTE) standard.

19. The scheduler of claim 18, wherein aggregating the multiple logical channels involves performing LTE carrier aggregation.

20. The scheduler of claim 15, wherein defining the one or more logical channels involves:
    identifying a scattered spectrum piece whose bandwidth is greater than a predetermined value; and
    defining a logical channel that is centered at the identified scattered spectrum piece.

21. The scheduler of claim 15, wherein the method further comprises:
    in response to determining that spectrum pieces encompassed by a single logical channel meet traffic need, desegregating previously aggregated multiple logical channels.

* * * * *